Figure 4:

G. A. SQUIER.
EYEGLASS MOUNTING.
APPLICATION FILED JUNE 7, 1909.
989,073.
Patented Apr. 11, 1911.
2 SHEETS—SHEET 1.
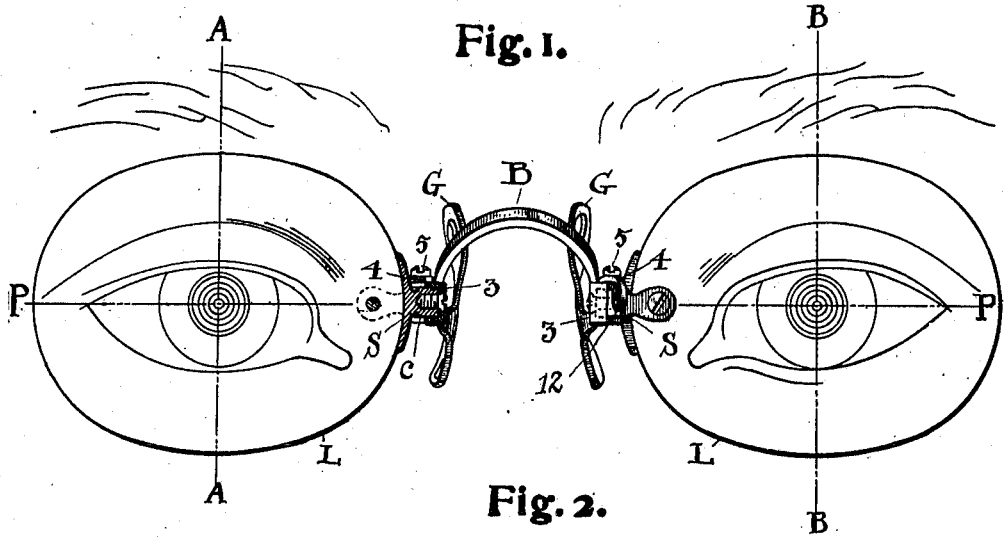
Fig. 1.
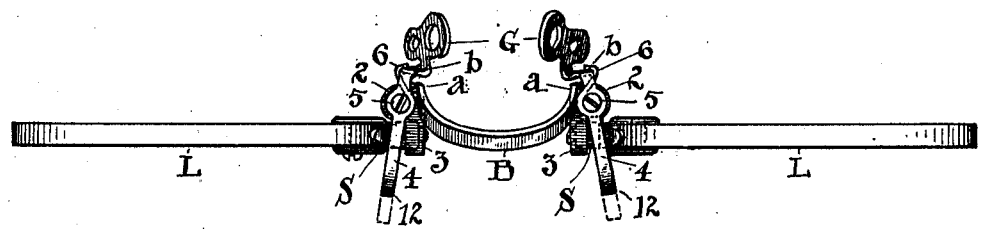
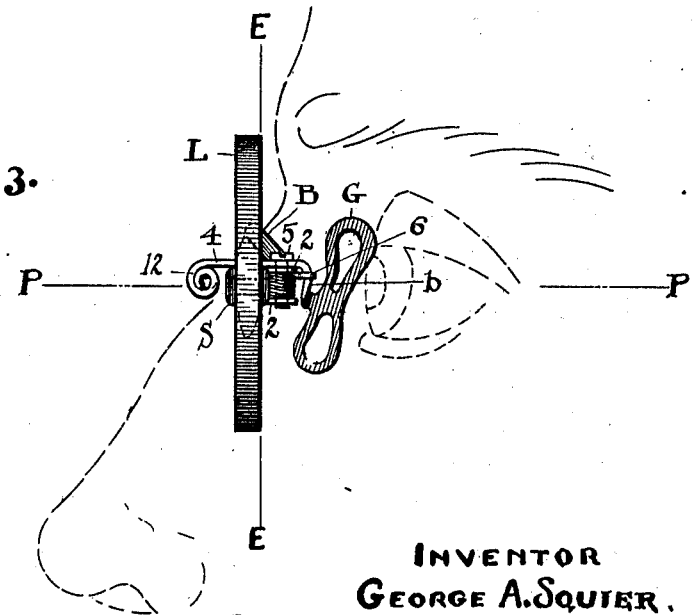
Fig. 3.
ATTEST
E. M. Fisher
J. C. Mussun.
INVENTOR
GEORGE A. SQUIER.
BY
Fisher & Moore ATTYS.

G. A. SQUIER.
EYEGLASS MOUNTING.
APPLICATION FILED JUNE 7, 1909.

989,073.

Patented Apr. 11, 1911.
2 SHEETS—SHEET 2.

ATTEST
E. M. Fisher
F. C. Musser

INVENTOR
GEORGE A. SQUIER.
BY Fisher & Mosher ATTYS.

UNITED STATES PATENT OFFICE.

GEORGE A. SQUIER, OF CLEVELAND, OHIO.

EYEGLASS-MOUNTING.

989,073.  Specification of Letters Patent.  Patented Apr. 11, 1911.

Application filed June 7, 1909. Serial No. 500,506.

*To all whom it may concern:*

Be it known that I, GEORGE A. SQUIER, citizen of the United States, residing at Cleveland, in the county of Cuyahoga and State of Ohio, have invented certain new and useful Improvements in Eyeglass-Mountings, of which the following is a specification.

My invention relates to an eye glass mounting adapted to provide an especially low resting and comfortably fitting bridge piece with detachable clamps or studs for the lenses and with adjustable guards, whereby various adjustments may be conveniently made and perfect fittings be obtained.

In constructions heretofore the low bridge piece mountings were united by the use of solder, the bridge piece and the clamps for holding the lenses being soldered together and the guards that hold to the nose were placed in an exposed position upon a flattened surface or space provided at each end of the bridge piece and held in position by the aid of screws.

There were and are serious objections by dealers to this form of construction, among which are the fact that the inner edge of the arch of the bridge piece in the mountings commonly used is outside of the inner plane or surface of the lenses, and in most cases allows the lenses to set too close to the eyes, causing the lashes to contact with the surface of the glass, and there is no way to change this except by soldering on an extension to offset the clamp for the lens or by keeping special mountings in stock. Any change in the mounting by adding an extension or by inserting pieces necessitates other changes such as the lengthening of the arm of the guard by splicing in a piece of metal so that it may be brought forward to project outside of the plane of the outside surface of the lens, where it can be easily grasped by the thumb and finger, or by shortening the same so that it will not project too far forward. All of this requires a lot of time, work and expense to accomplish and only an inferior article is produced when finished.

Another objection is that the lenses are not carried far enough back in cases requiring a more retired position, the bridge piece then striking the nose too soon, or when a larger one is used allowing the guards to go back too far and draw the flesh at the inner corners of the eyes. Or, again, in case the guards are placed on the nose where they fit it carries the bridge piece too far forward from the nose and the lenses away from the eyes, and this makes an unsatisfactory appearance and a poor adjustment.

Other objections to the old construction are the wearing of the guards.

It is my object in the present invention to overcome these objections, and this I have accomplished by means of the simple but important improvements described in connection with the accompanying drawings, in which—

Figure 5:
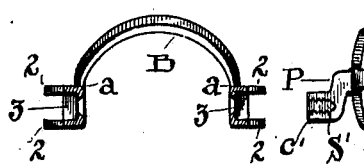
Figure 6:
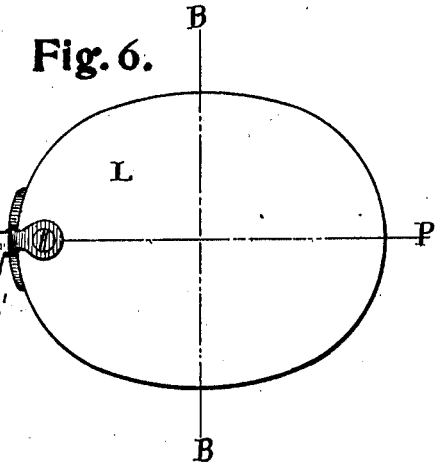
Figure 7:
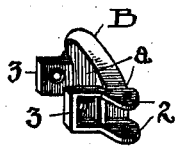
Figure 8:
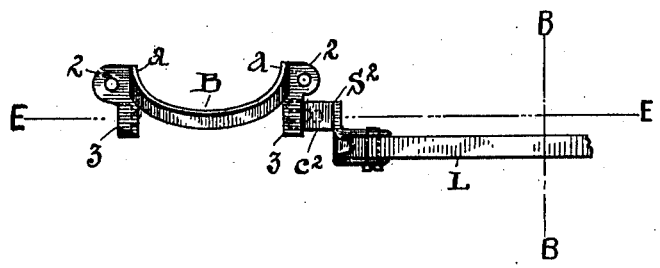
Figure 9:
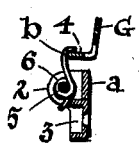
Figures 11, 12:
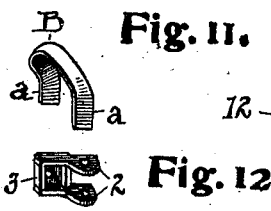
Figure 10:
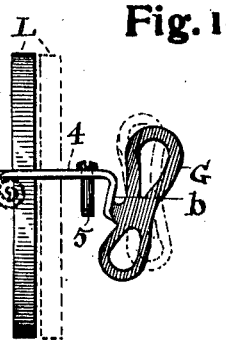
Figure 13:
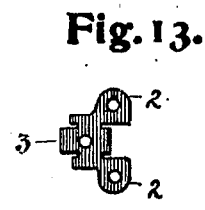

Figure 1 is a front elevation of the mounting and lenses, a portion of the mounting at one side being sectioned. Fig. 2 is a plan view of Fig. 1. Fig. 3 is an edge elevation of the glasses as they appear on the wearer's nose and showing the relations of the bridge and guard to each other and to the lens. Fig. 4 is a detail of one of the lens supporting studs or clamps. Fig. 5 is a detail of the bridge or bridge piece, sectioned at its ends where the studs are socketed. Fig. 6 is a detail of one form of offset stud and a lens mounted thereon, the stud in this case being adapted to fix the relative elevation thereof above or below the pupilary line as any given fitting may require. Fig. 7 is a perspective view of the bridge piece complete, as it appears also in section Fig. 5. Fig. 8 represents a plan view of the bridge piece and one lens and an offset stud connecting said parts and adapted to set the lens inward and outward. Fig. 9 shows a sectional view of a portion of the bridge and one of the guard arms and the spring bearing against the same. Fig. 10 is an elevation of one of the guards and an edge view of a lens in full and dotted lines, and showing by dotted lines the adjustability of the guard relatively to the lens. Figs. 11 and 12 represent parts of the bridge before permanently connecting same, and Fig. 13 is a view of a blank from which the box and ears of each end of the bridge in Fig. 12 is made.

Referring first to the several separate parts constituting the complete mounting and in which the invention resides, B is the inclined bride or bridge piece Figs. 5 and 7, which is especially constructed at its ends with horizontal portions extending forwardly and laterally to receive or support the nose guards G and the studs or clamps S, Figs. 4, 6 and 8. In detail, this construction involves two upper and lower perforated ears 2, which are located at the immediate or perpendicular end portions $a$ of the guard, and boxes or sockets 3 forward of said ears. Said boxes are rectangular or square in shape and open at one side and are inclosed or flanged all around and have screw holes in their rear walls to enable screws to be introduced for fastening the studs S rigidly in place therein. Said rear walls are flush inside with the inside face of base $a$ of bridge B, and I prefer to form the box 3 from a blank as shown in Fig. 13 and solder the same when formed to base $a$ of bridge G although said bridge including the box 3 may be made in one piece.

The nose guards G are provided with arms or stems 4 constructed to lie flush upon the upper faces of boxes 3 and the two ears 2 on each side of the bridge, said arms being provided with pivot holes for screws 5 which pass through said arms. Said ears 2 also have openings for fixing the guards upon the mounting, the openings in the lower ears being threaded to take screws 5. Between the said ears 2 upon each screw 5 I arrange a coiled spring 6, which is fixed or bears at one end against box 3 and has its other end bearing against the right angled shank or portion $b$ of arm 4 just outside said ears, see Fig. 9. The guards are thus spring pressed to hold the glasses upon the nose and the spring resistance is such that the guard can yield as much as comfort in wearing may require, and forwardly extending arms 4 afford a convenient and safe means for placing the glasses in position or for removing them from the nose, especially if the outer ends of said arms are properly positioned to be grasped by the thumb and forefinger of the hand. The spring is hidden from view when worn by reason of its position behind other parts and hence is not objectionable as to appearances, and furthermore said spring is housed between the ears 2 and fully protected against displacement or damage. Again, any adjustment or tightening of screw 5 in ears 2 will not, and in fact cannot affect the operation of the spring by causing any bind between its coils, nor will the spring unloosen the screw in its bearings. The double ears for each screw also hold the screws in fixed vertical alinement and prevent tilting, bending or displacement thereof.

Referring now again to bridge B it will be observed that it is of the sectional hoop type. That is to say it is adapted to rest flatwise upon or against both the top and the sides of the nose of the wearer and to be comfortably conformed thereto. Obviously, by the construction shown in which the lower portions $a$ of the bridge proper are carried backward from the back surface of the lens and downward from the horizontal center of the lens and attached to the inner side of the clamping box, it is made possible to get an increased depth to the bridge and still retain the one plane relation of the back surface of the lens and back edge of the bridge piece which is so desirable, whereby by using the different offset, inset, raising or lowering and lengthening or shortening studs S, S' and $S^2$, Figs. 4, 6 and 8, any desired position of the lenses can be obtained to give a perfect fit. As to these several parts, I have provided each stud with a socket portion or tenon $c$, $c'$ and $c^2$, respectively, and each and all fit alike in box or socket 3. But in order to be enabled to set a lens L any desired distance from the bridge laterally according to interpupilary distances, or in other words the distance between the eyes of different persons, I may construct all the studs of the maximum length and then file down the ends of portion 3 at the time of fitting as the person may need, or I may employ studs of varying lengths which may be filed down in less degree if needed. The fitting is thus made to conform to the requirements without cutting or splicing any of the parts or otherwise changing them, and this is done without endangering or weakening a part, which is material. Any one of many different styles of studs may be used as may be further needed to fit a person, but ordinarily, a plain stud, Fig. 4, suffices. However, if a higher or a lower setting of the lens be needed the stud seen in Fig. 6 is used, and if greater distance from the eye, the stud in Fig. 8. In this figure the line E—E shows the medium position, as by stud Fig. 4, so that lens L is carried forward the full throw of stud $S^2$. Elevation of the lens being especially by stud S', the maximum rise is shown in Fig. 6, and the reverse of this would drop the lens relatively in the same proportion. This interchangeability of studs is in addition to the shortening of the stud head $c$ by filing or the like.

In the matter of the nose guards, the coincident faces thereof may be corrugated or perforated in any of the known ways. The arms or stems 4 of these guards being bent flat-wise and upward at right angles $b$ between the guard proper and the ends of the arms, admits of changing the angle of the face of the guards so as to occupy different angles with respect to the plane of the lenses. The ends 12 of said arms outside of the right angled portions $b$ are so constructed as to be adaptable by rolling up or unrolling the metal to occupy the same relative position to the forward surface of the lenses when the different studs are used, thus enabling said extremities to be readily grasped by the thumb and finger in placing the glasses on the nose. The amount of metal in the roll 12 will depend on the position of the lens, say in Fig. 8 as compared with Fig. 2. In Fig. 8, with the lens set out as shown therein the roll or coil 12 will have to be unrolled or opened in the same proportion or the arms 4 would be too short to grasp with the fingers, and a certain amount of surplus stock is therefore provided for such contingencies. Thus it will be seen that this adjustability of the guard is important, especially when taken in connection with the removable and replaceable studs, as each change in the position of the lens also usually involves a change in the guard.

What I claim is:

1. An eye glass mounting consisting of a bridge piece having horizontal portions extending forwardly at its base ends, combined with clamping studs for the lenses and pivoted guards for the nose and springs for the said guards all detachably secured to said base portions.

2. An eye glass mounting comprising a bridge piece, nose guards pivotally mounted thereon at its base ends, springs for said guards, and clamping studs for the lenses mounted upon said bridge piece in advance of said springs to conceal the same from view.

3. An eye glass mounting comprising a bridge piece having forwardly extending portions at its base ends with lateral flanges thereon, in combination with nose guards pivotally mounted upon said flanges and clamping studs for the lenses removably fixed within said flanges.

4. An eye glass mounting comprising a bridge piece and a pair of lenses adjustably mounted thereon, and spring pressed guards pivotally mounted on said bridge piece having forwardly extending arms with coiled extremities adapted to be rolled and unrolled to shorten or lengthen said arms relatively to the said lenses.

5. An eye glass mounting comprising a bridge piece having boxes, guards pivotally mounted upon said bridge piece and studs adapted to be removably inset into said boxes.

6. An eye glass mounting comprising a bridge piece having horizontal base portions formed into boxes and ears, combined with guards pivotally secured to said ears and springs therefor between said ears, and clamping studs for the lenses removably mounted within said boxes.

7. An eye glass mounting comprising a bridge piece and a pair of lenses secured thereto, said bridge piece having a pair of lateral ears at each base end thereof, and guards pivotally mounted upon said ears and coiled springs confined between said ears and engaged with said guards.

8. In eye glass mountings having removable studs and lenses and pivoted spring pressed guards, a bridge piece adapted to set and conform to the nose of the wearer and having horizontal portions constructed with recessed sides at their front ends, and perforated ears at the rear thereof, whereby the lens studs and the guards and springs therefor may be seated and fixed upon said bridge piece.

9. An eye glass mounting comprising an arched bridge piece having base extensions bent forwardly at an inclination to the arch portion thereof, spring pressed noseguards pivotally mounted upon said bridge piece, and clamping studs for the lenses detachably secured to the front end of said extensions below the crown of said bridge piece, whereby the inner planes of the lenses coincide approximately with said crown at its resting point on the arch of the nose.

10. An eye glass mounting consisting of an inclined bridge piece and spring pressed nose guards pivotally secured at its base ends, and supporting studs for the lenses detachably secured to said bridge piece forwardly of the base ends of the said bridge piece and in advance of the guard pivots, whereby the inner planes of the lenses are alined with the arch of the bridge piece.

11. An eye glass mounting comprising an inclined bridge piece having front extensions at its base ends and arched to rest upon and conform snugly to the nose, and spring pressed guards pivoted to said base ends to yieldingly grip the nose, in combination with lens supporting studs having square tenons, and means to detachably secure said tenons upon said front extensions to permit various adjustments of the lenses to be made relatively to the pupilary line and to interpupilary distances and in respect to the eye and the eye lashes.

12. An eye glass mounting comprising an inclined bridge piece adapted to rest flat upon the nose, clamping studs for the lenses removably mounted upon said bridge piece adapting various adjustments in fittings to be made, and guards mounted upon said bridge piece having adjustable finger engaging ends adapted to permit changes of the lenses and said studs without substituting new guards.

13. An eye glass mounting comprising a bridge piece and studs for the lenses removably mounted thereon, in combination with pivoted spring pressed guards having extensible and contractible portions at both front and rear to permit various adjustments to be made therein on both sides of the lenses in fitting the eyeglasses to the wearer.

14. As an article of manufacture and sale, a bridge piece for eye glass mountings comprising an inclined arched body having rigid forwardly projecting base extensions consisting of hollow stud boxes provided with screw openings having the axes thereof in alinement with each other.

15. In eye glass mountings, a bridge piece comprising an arched body having base extensions projecting forwardly thereof at an inclination thereto and having integral flat perforated ears projecting laterally on a horizontal plane at the base ends of said body and adapted to support vertically pivoted guards for said mounting.

16. An eye glass mounting comprising an arched bridge piece having base extensions inclined in respect thereto and projecting forwardly to a point approximately opposite the crown of the arch, in combination with lenses and interchangeable supporting studs having separate detachable screw connections with said lenses and with said extensions.

In testimony whereof I affix my signature in presence of two witnesses.

GEORGE A. SQUIER.

Witnesses:
F. C. MUSSUN,
E. M. FISHER.

---

Copies of this patent may be obtained for five cents each, by addressing the "Commissioner of Patents, Washington, D. C."